United States Patent
Gulino et al.

(10) Patent No.: US 11,454,975 B2
(45) Date of Patent: Sep. 27, 2022

(54) PROVIDING ACTIONABLE UNCERTAINTIES IN AUTONOMOUS VEHICLES

(71) Applicant: UATC, LLC, San Francisco, CA (US)

(72) Inventors: Cole Christian Gulino, Pittsburgh, PA (US); Alexander Rashid Ansari, San Francisco, CA (US)

(73) Assignee: UATC, LLC, Mountain View, CA (US)

( * ) Notice: Subject to any disclaimer, the term of this patent is extended or adjusted under 35 U.S.C. 154(b) by 917 days.

(21) Appl. No.: 16/043,759

(22) Filed: Jul. 24, 2018

(65) Prior Publication Data
US 2020/0004259 A1 Jan. 2, 2020

Related U.S. Application Data

(60) Provisional application No. 62/691,124, filed on Jun. 28, 2018.

(51) Int. Cl.
*G05D 1/02* (2020.01)
*G06K 9/00* (2022.01)

(52) U.S. Cl.
CPC ......... *G05D 1/0221* (2013.01); *G05D 1/0219* (2013.01); *G05D 1/0253* (2013.01); *G06K 9/00805* (2013.01)

(58) Field of Classification Search
CPC .. G05D 1/0221; G05D 1/0219; G05D 1/0253; G05D 2201/0213; G05D 1/0251; G05D 1/024; G05D 1/0257; G05D 1/0274; G06K 9/00805
USPC .......................................................... 701/28
See application file for complete search history.

(56) References Cited

U.S. PATENT DOCUMENTS

| 8,738,282 | B1 * | 5/2014 | Prokhorov | .......... B60R 21/0134 701/301 |
| 2013/0197736 | A1 * | 8/2013 | Zhu | ...................... G05D 1/0088 701/26 |
| 2014/0129129 | A1 * | 5/2014 | Prokhorov | .......... B60R 21/0134 701/301 |
| 2018/0029706 | A1 * | 2/2018 | Baruch | ..................... B64D 1/02 |
| 2018/0047182 | A1 * | 2/2018 | Gelb | ..................... G06F 3/0425 |

(Continued)

OTHER PUBLICATIONS

International Search Report and Written Opinion for Application No. PCT/US2019/039529, dated Oct. 7, 2019, 13 pages.

*Primary Examiner* — Muhammad Shafi
(74) *Attorney, Agent, or Firm* — Dority & Manning, P.A.

(57) ABSTRACT

Systems and methods are provided for detecting objects of interest. A computing system can input sensor data to one or more first machine-learned models associated with detecting objects external to an autonomous vehicle. The computing system can obtain as an output of the first machine-learned models, data indicative of one or more detected objects. The computing system can determine data indicative of at least one uncertainty associated with the one or more detected objects and input the data indicative of the one or more detected objects and the data indicative of the at least one uncertainty to one or more second machine-learned models. The computing system can obtain as an output of the second machine-learned models, data indicative of at least one prediction associated with the one or more detected objects. The at least one prediction can be based at least in part on the detected objects and the uncertainty.

29 Claims, 10 Drawing Sheets

(56) References Cited

U.S. PATENT DOCUMENTS

2018/0089563 A1\* 3/2018 Redding .............. G05D 1/0088
2018/0107215 A1   4/2018 Djuric et al.

\* cited by examiner

PROVIDING ACTIONABLE UNCERTAINTIES IN AUTONOMOUS VEHICLES

RELATED APPLICATION

This application claims priority to and the benefit of U.S. Provisional Patent Application No. 62/691,124, titled "Providing Actionable Uncertainties in Autonomous Vehicles," filed on Jun. 28, 2018. U.S. Provisional Patent Application No. 62/691,124 is hereby incorporated by reference herein in its entirety.

FIELD

The present disclosure relates generally to improving the ability of an autonomous vehicle to navigate itself within an environment including objects external to the autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of detecting objects of interest that includes inputting, by a computing system comprising one or more computing devices, sensor data to one or more first machine-learned models associated with detecting objects external to an autonomous vehicle. The method includes obtaining, by the computing system as an output of the one or more first machine-learned models, data indicative of one or more detected objects external to the autonomous vehicle. The method includes determining, by the computing system, data indicative of at least one uncertainty associated with the one or more detected objects. The method includes inputting, by the computing system, the data indicative of the one or more detected objects and the data indicative of the at least one uncertainty associated with the one or more detected objects to one or more second machine-learned models configured to generate predictions in association with objects external to the autonomous vehicle. The method includes obtaining, by the computing system as an output of the one or more second machine-learned models, data indicative of at least one prediction associated with the one or more detected objects, the at least one prediction based at least in part on the one or more detected objects and the at least one uncertainty.

Another example aspect of the present disclosure is directed to a computing system that includes one or more first machine-learned models associated with detecting objects external to an autonomous vehicle based at least in part on sensor data, one or more second machine-learned models configured to generate predictions in association with objects external to the autonomous vehicle, one or more processors, and one or more non-transitory computer-readable media that collectively store instructions that, when executed by the one or more processors, cause the computing system to perform operations. The operations include generating, as an output of the one or more first machine-learned models, data indicative of one or more detected objects external to the autonomous vehicle, generating data indicative of at least one uncertainty associated with the one or more detected objects, inputting the data indicative of the one or more detected objects and the data indicative of the at least one uncertainty associated with the one or more detected objects to the one or more second machine-learned models, and generating, as an output of the one or more second machine-learned models, data indicative of at least one prediction associated with the one or more detected objects. The at least one prediction is based at least in part on the one or more detected objects and the at least one uncertainty.

Yet another example aspect of the present disclosure is directed to an autonomous vehicle that includes one or more processors, and one or more non-transitory computer-readable media that collectively store instructions that, when executed by the one or more processors, cause the one or more processors to perform operations. The operations include inputting sensor data to one or more first machine-learned models associated with detecting objects external to an autonomous vehicle, obtaining, as an output of the one or more first machine-learned models, data indicative of one or more detected objects external to the autonomous vehicle, determining data indicative of at least one uncertainty associated with the one or more detected objects, inputting the data indicative of the one or more detected objects and the data indicative of the at least one uncertainty associated with the one or more detected objects to one or more second machine-learned models configured to generate predictions in association with objects external to the autonomous vehicle, and obtaining, as an output of the one or more second machine-learned models, data indicative of at least one prediction associated with the one or more detected objects, the at least one prediction based at least in part on the one or more detected objects and the at least one uncertainty.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
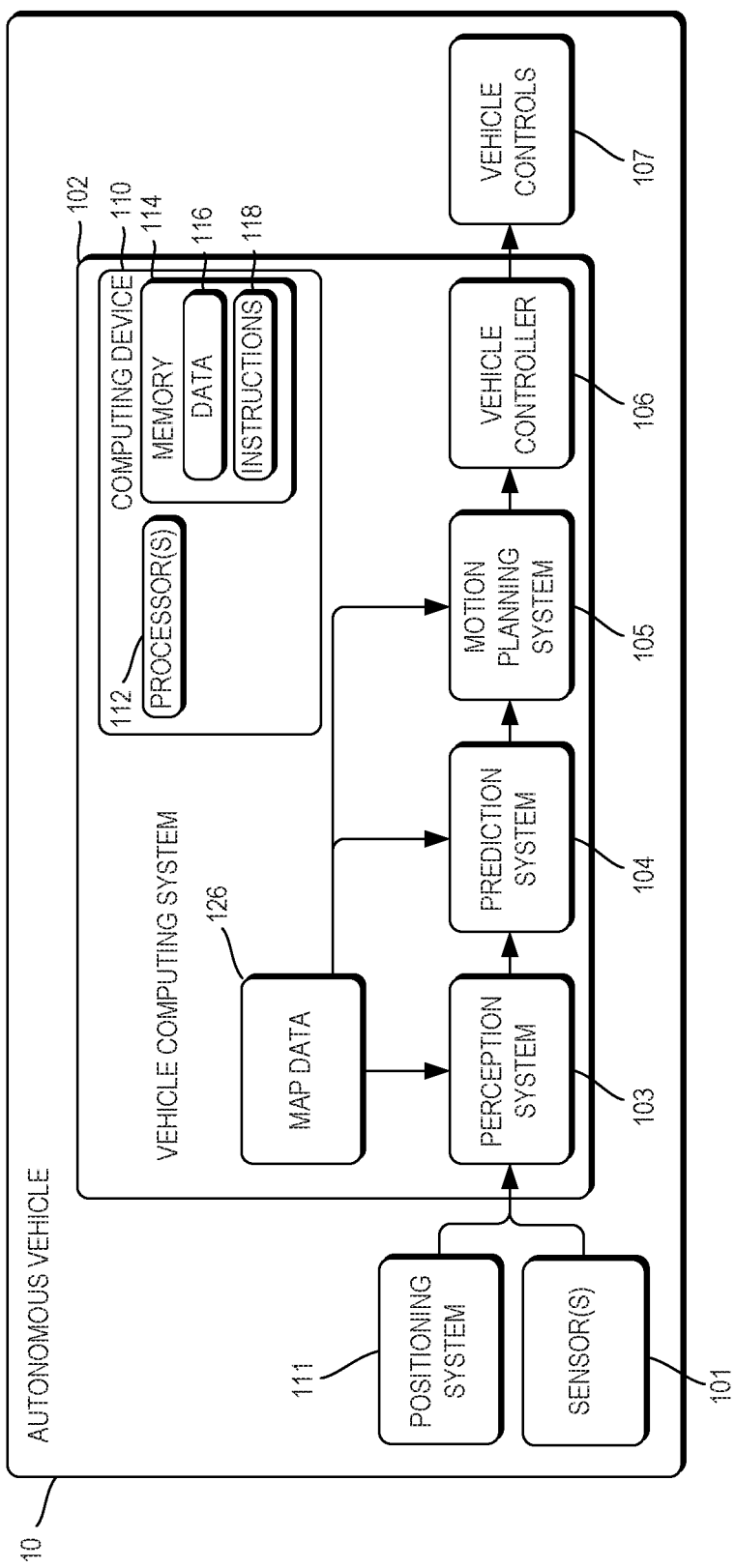
FIG. 1 depicts a block diagram of an example autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods that generate and share uncertainty data between components of an autonomous vehicle computing system to improve object prediction and motion planning for the autonomous vehicle. In some implementations, for example, a perception system of the vehicle computing system may generate data indicative of one or more objects detected based at least in part on sensor data from a sensor system of the autonomous vehicle. The vehicle computing system may additionally generate uncertainty data including data indicative of an uncertainty associated with the one or more detected objects. The data indicative of the one or more detected objects and the data indicative of the uncertainty associated with the one or more detected objects can be provided to additional components of the vehicle computing system, such as a prediction system and/or motion planning system. The additional components can utilize the uncertainty associated with the detected objects to improve object prediction and/or motion planning processes for the autonomous vehicle.

More particularly, in some implementations, the vehicle computing system can generate data indicative of one or more object detections using one or more machine-learned models associated with a perception system. The vehicle computing system may determine an uncertainty associated with the object detections provided by the machine-learned model(s) configured for object detection, tracking, and/or classification. Data indicative of a determined uncertainty (also referred to as an uncertainty data) associated with a detected object can be provided to one or more additional machine-learned models that are configured for object prediction and/or motion planning for the autonomous vehicle. The uncertainty associated with a detected object can be used with data indicative of the detected object to generate an object prediction, such as an expected trajectory of the object, and/or a motion plan for the autonomous vehicle.

An autonomous vehicle can be a ground-based autonomous vehicle (e.g., car, truck, bus, etc.) or other type of vehicle. The autonomous vehicle can include a computing system that assists in controlling the autonomous vehicle. In some implementations, the autonomous vehicle computing system can include a perception system, a prediction system, a motion planning system, and an uncertainty system that cooperate to perceive the surrounding environment of the autonomous vehicle and determine one or more motion plans for controlling the motion of the autonomous vehicle accordingly. The autonomous vehicle computing system can include one or more processors as well as one or more non-transitory computer-readable media that collectively store instructions that, when executed by the one or more processors, cause the autonomous vehicle computing system to perform various operations as described herein.

In some implementations, a perception system of a vehicle computing system may include one or more first machine-learned models associated with detecting objects external to an autonomous vehicle. By way of example, the one or more first machine-learned models may include object detection models included as part of a segmentation or detection component of the perception system, object tracking models included as part of a tracking component of the perception system, and/or classification models included as part of a classification component of the perception system. An object detection model may generate data indicative of a detected object, also referred to as object detection data. For example an object detection model may obtain sensor data from one or more sensors of a sensor system and provide data indicating that an object has been detected. For instance, an object detection model may generate, based on the sensor data, object detection data indicating the presence or existence of a vehicle, pedestrian, bicycle, or other object type in an environment external to the autonomous vehicle. An object tracking model may generate data indicative of a state of a detected object, also referred to as state data. For example, an object tracking model may generate data relating to an object's position, velocity, acceleration, heading, or other information relative to an object's current state. In some examples, an object tracking model may combine information from multiple cycles or frames of sensor data as part of determining object state information. A classification model may generate data indicative of a classification of a detected object, also referred to as classification data. For example, a classification model may generate data indicating to which of a plurality of classes a detected object belongs. Example classes of objects for which a classification model may provide a classification may include vehicles, bicycles, pedestrians, signs, or any other type of object for which a classification is desired.

A vehicle computing system in accordance with embodiments of the disclosed technology may generate data indicative of an uncertainty associated with an output of any of the models included as part of a perception system. For example, the vehicle computing system may generate detection uncertainty data including data indicative of an uncertainty associated with an object detection provided by an objection detection model. The system may generate state uncertainty data including data indicative of an uncertainty associated with an object state provided by an object tracking model. The system may generate classification uncertainty data including data indicative of an uncertainty associated with an object classification provided by a classification model.

In some examples, the data indicative of the uncertainty associated with one or more detected objects may be provided to one or more second machine-learned models of a prediction system, in addition to the data indicative of the one or more detected objects. The one or more second machine-learned models of the prediction system can then determine one or more object predictions based at least in part on the one or more detected objects as well as the uncertainty associated with the one or more detected objects. By way of example, the one or more second machine-learned models may determine a predicted trajectory of an object, a predicted position of an object, a predicted velocity of an object, a predicted acceleration of an object, a predicted heading of an object, or other information pertaining to a predicted state of an object. The prediction system may utilize the uncertainty associated with an object detection as part of generating a prediction using the one or more second machine-learned models.

In some implementations, data indicative of uncertainty associated with detected objects can be provided to one or more third machine-learned models of the motion planning system. The data indicative of uncertainty may be provided to the motion planning system, in addition to the data indicative of the detected objects, to aid in motion planning based on detected objects in some examples. The one or more third machine-learned models of the motion planning system can generate one or more motion plans based at least in part on the one or more detected objects, as well as the uncertainty associated with the one or more detected objects.

According to some example embodiments, an uncertainty system may additionally or alternatively determine an uncertainty associated with object predictions. Data indicative of an uncertainty associated with an object prediction can be provided to the motion planning system, in addition to the data indicative of the object prediction. By way of example, the one or more second machine-learned models may generate an object prediction, such as a predicted trajectory of an object. The uncertainty system can determine an uncertainty associated with the object prediction. Data indicative of the uncertainty associated with the object prediction can then be provided to the motion planning system to aid in motion planning processes. For instance, the prediction system may calculate two or more predicted trajectories for an object and provide probability distributions for each of the predicted trajectories to the motion planning system. In this manner, the motion planning system may generate one or more motion plans based on both of the predicted trajectories, as well as the probability distribution for each of those trajectories. In some examples, the motion planning system only receives uncertainty data associated with the prediction system, such as a probability distribution associated with a predicted object trajectory. In other examples, however, the motion planning system can additionally or alternatively receive uncertainty data associated with the perception system, such as a probability distribution associated with an object detection or classification.

According to example embodiments, the uncertainty of an object may be determined based at least in part on an object state, an object history, a local context associated with an object, and/or a global context associated with an object. The object state may include various parameters such as position, heading, shape, velocity, acceleration, etc. associated with an object. A tracking component of the perception system may provide an output including state and/or uncertainty data associated with the state of an object. The state information can be used with history data associated with object detections to determine an uncertainty. History information such as one or more previous object detections may be used to determine uncertainty associated with an object detection. Thus, the length of time or number of cycles during which an object has been detected and/or tracked can be used as part of a current object detection and uncertainty determination. For example, the system may use a classification or state associated with an object from a previous cycle as part of determining the classification or state of the object for a current cycle. More particularly, the uncertainty system may be configured to increase the uncertainty associated with an object if its classification or state changes between cycles, as this may be indicative of a lack of certainty in the detection or prediction. Additionally, a history of the uncertainty associated with an object can be used as part of determining a current object detection and uncertainty associated with the detection.

In some examples, a predetermined number of previous states of an object can be stored and used to determine an uncertainty associated with a detected object. The most recent states of an object can be passed to the prediction system such that history features can be calculated for an object. Additionally, a predetermined number of future states can be forward simulated and passed as a placeholder to be used for predicting trajectories using instance flow. The past state determinations and future predictions can be used as part of determining and/or modifying an uncertainty associated with an object. Uncertainties or previous state information can be modified to be more in-line with a full trajectory of an object. The use of past history features may improve prediction, as an analysis of a trajectory may allow a determination of to what degree an object detection should be trusted by downstream components.

A local context associated with a detected object may also be used as part of determining uncertainty data associated with the object. For example, the system may receive sensor data from multiple sensors and generate object detection data based on a perception pipeline or other detection system associated with each of the sensors. According to example embodiments, uncertainty data may be generated for one or more object detections based on the outputs of multiple perception pipelines. For instance, the system may include a fusing system to combine the outputs of multiple perception pipelines. The system may provide an uncertainty for the one or more object detections based at least in part on the outputs of the various pipelines. For instance, the system may use a concurrence between the output of multiple pipelines to increase the uncertainty associated with an object detection or a disagreement between outputs to decrease the uncertainty.

Additionally, a global context associated with a detected object may be used as part of determining uncertainty associated with an object. The system may use an object's position or locality with respect to the vehicle and/or a number of points in sensor data corresponding to the object to determine an uncertainty associated with the object. For example, an object detection associated with a small number of points (e.g., one) at far range from the vehicle may be considered to be trustworthy. Because an object at far range can be expected to only have a small number of sensor data points, a low uncertainty can be assigned to the object detection. By contrast, an object detection associated with a small number of points at close range to the vehicle may be considered untrustworthy. Because an object at close range can be expected to have a large number of sensor data points, a high uncertainty can be assigned to the object detection. Map information can additionally be used to provide global context as part of generating an uncertainty in association with an object detection. Map data can be used to determine whether an object detection is consistent with a global context of a scene or environment external to the vehicle. Thus, map data can be used independently of detection to provide an assessment of the consistency of a detection with the environment. Map information may be used with statistics associated with objects in a scene to gather information (e.g., using a graph structure) in order to provide uncertainty information associated with the objects.

In some example implementations, a vehicle computing system may include a separate uncertainty system configured to determine uncertainty data associated with object detections and/or object predictions. For example, the vehicle computing system may include an uncertainty system that receives one or more outputs of one or more machine-learned models of the perception system and/or prediction system. For instance, data indicative of an object detection, object state, and/or object classification may be provided from the appropriate machine-learned model to the uncertainty system. The uncertainty system may determine an uncertainty associated with any one of the models, such as an uncertainty associated with whether the object was actually detected, an uncertainty associated with the state of the object, and/or an uncertainty associated with the classification of the object. The uncertainty system may then provide data indicative of uncertainty associated with detected objects to the prediction system. The data indicative of the uncertainty associated with the detected objects can be provided in addition to the data indicative of the detected objects. In some examples, the external uncertainty system may receive one or more outputs of one or more machine-learned models of the prediction system. The uncertainty system can determine an uncertainty associated with one or more object predictions and provide the uncertainty data to the motion planning system in addition to the data indicative of the object prediction.

In other example embodiments, an uncertainty system may be implemented within one or more machine-learned models configured for object detection or object prediction. For example, a machine-learned model associated with object detection may be configured to generate data indicative of the uncertainty associated with a detected object, in addition to generating data indicative of the detected object. Similarly, machine-learned models associated with object tracking and object classification may be configured to generate data indicative of an uncertainty associated with an object state and object classification, respectively. Likewise, machine-learned models associated with object prediction can be configured to generate uncertainty associated with object predictions. In some examples, an uncertainty system may be implemented partially within one or more machine-learned models and partially external to the one or more machine-learned models.

An uncertainty system can be implemented at least partially within one or more fusing layers of a perception system and/or prediction system in some example implementations. One or more fusing layers may be provided within a perception system, for example, to fuse multiple perception outputs associated with different sensors of the autonomous vehicle. For instance, the sensor data associated with a first sensor may be processed using a first perception pipeline including a first set of machine-learned models for object detection, object tracking, and/or object classification. The sensor data associated with a second sensor may be processed using a second perception pipeline including a different set of machine-learned models for object detection, object tracking, and/or object classification. The one or more fusing layers can receive the outputs of the different perception pipelines and determine a final object detection, final object state, and/or final object classification from the outputs of the different perception pipelines. According to some embodiments, the probability system may determine an uncertainty associated with a detected object based on outputs of different perception pipelines associated with different sensors of the autonomous vehicle.

An uncertainty system in accordance with example embodiments may determine a probability distribution for different outputs associated with different perception pipelines in some implementations. As a specific example, a first perception pipeline may generate a first object classification for a detected object while a second perception pipeline may generate a second classification for the same detected object. The uncertainty system may generate a probability distribution associated with the different object classifications and provide that probability distribution to the prediction system in addition to both of the object classifications generated by the different perception pipelines.

In accordance with some embodiments, one or more machine-learned models may be utilized to generate data indicative of uncertainty associated with object detections and/or object predictions. As earlier described, a machine-learned model configured for object detection, tracking, and/or classification may be additionally configured to generate data indicative of uncertainty associated with its outputs. In some examples, one or more additional machine-learned models external to the machine-learned models configured for object detection, tracking, and/or classification may be used to generate data indicative of uncertainty. In either case, a machine-learned model in accordance with example embodiments can be trained to generate a true probability distribution for its output based on a distribution of inputs. For example, the machine-learned model may be trained to generate multiple outputs and an actual probability or uncertainty associated with each output, rather than be trained to generate a single output with a highest level of certainty.

More particularly, in some examples, a model configured to generate uncertainty data associated with object detections and/or object predictions may provide a continuous, calibrated uncertainty in association with a perception system or prediction system output. Such a model can be trained by analyzing the joint probability of all outputs given a set of input data. As a specific example, a Bayesian binary classifier may be used in some examples, also referred to as a Gaussian naïve Bayes. Using such a model, underlying data can be analyzed to produce a true estimate of probabilities given a distribution of the inputs seen during training of the machine-learned model. In this manner, a continuous calibrated uncertainty can be provided whereby the probability is continuous between a value of zero and one and is not a discrete value of zero or one as may be the case with the outputs of many classifiers. Uncertainty can be calibrated such that it is representative of a true distribution. A true probability distribution having a calibrated uncertainty may provide actionable levels of uncertainty. As a contrast, many discriminative models are trained to provide classifications for a most confident determination which is close to zero or one.

According to one example aspect of the present disclosure, a computing system comprising one or more computing devices is provided. The computing system can be configured to perform a computer-implemented method of detecting objects. The method can include inputting, by the computing system, sensor data to one or more machine-learned models associated with detecting objects external to an autonomous vehicle based at least in part on sensor data. The method can include obtaining, by the computing system, as an output of the one or more machine-learned models, data indicative of one or more detected objects external to the autonomous vehicle. The method can include generating, by the computing system, data indicative of at least one uncertainty associated with the one or more detected objects. The method can include inputting the data indicative of the one or more detected objects and the data indicative of the at least one uncertainty associated with the one or more detected objects to one or more second machine-learned models configured to generate predictions in association with objects external to the autonomous vehicle. The method can include obtaining, by the computing system as an output of the one or more second machine-learned models, data indicative of at least one prediction associated with the one or more detected objects. The at least one prediction is based at least in part on the one or more detected objects and the data indicative of the at least one uncertainty.

According to one example aspect of the present disclosure, the computing system can additionally input the data indicative of the at least one uncertainty associated with one or more detected objects and the data indicative of the at least one prediction associated with one or more detected objects to one or more third machine-learned models. The computing system can obtain as an output of the one or more third machine-learned models, data indicative of at least one motion plan based on one or more detected objects. The computing system can control the autonomous vehicle based at least in part on the at least one motion plan. In some examples, the data indicative of the at least one motion plan can be generated based at least in part on the data indicative of the at least one uncertainty associated with the one or more detected objects and the data indicative of the at least one prediction associated with the one or more detected objects.

In some implementations, the computing system can additionally generate data indicative of at least one uncertainty associated with a prediction associated with one or more detected objects. The at least one uncertainty associated with the prediction can be input by the computing system to the one or more third machine-learned models along with data indicative of the at least one prediction. The one or more third machine-learned models can generate one or more motion plans based at least in part on the data indicative of the uncertainty associated with the prediction.

In some implementations, the computing system can generate data indicative of at least one uncertainty using an uncertainty system that is external to one or more machine-learned models for which the uncertainty system is generating the at least one uncertainty. Additionally and/or alternatively, the computing system can generate data indicative of at least one uncertainty using an uncertainty system that includes one or more components integrated within the one or more machine-learned models for which the uncertainty system is generating the at least one uncertainty.

The systems and methods of the present disclosure provide a number of technical effects and benefits, particularly in the areas of autonomous vehicles and computing technology. An autonomous vehicle in accordance with embodiments of the disclosed technology may generate data indicative of uncertainty associated with detected objects in the environment external to the autonomous vehicle and/or predictions with respect to the detected objects. The various data indicative of uncertainty may be used by a vehicle computing system to improve autonomous vehicle operations. By way of example, the autonomous vehicle may utilize data indicative of uncertainty associated with detected objects and/or object predictions to generate improved predictions and/or motion plans. As a specific example, the use of data indicative of uncertainty may allow the system to avoid rapid changes between object detections and/or object classifications. The introduction of data indicative of uncertainty may allow the system to more accurately determine when to change an object's detection or classification. As a specific example, the utilization of uncertainty may reduce or otherwise alleviate hard switching between motion plans which may result in hard braking or hard turns of the vehicle in some instances. The utilization of actionable uncertainty may be contrasted with techniques that utilize a single best detection or classification without data indicative of uncertainty. In such systems, a detection or classification of a detected object may change from cycle to cycle, resulting in updated or new motion plans which may cause hard braking or turning of the vehicle.

The use of uncertainty provides additional actionable information to various systems of the autonomous vehicle to improve general operation of the autonomous vehicle. More specifically, the use of uncertainty data allows multiple possible detections, states, and/or classifications to be passed between components of the vehicle computing system. The various components can then use the uncertainty data to determine how to process multiple detections, changing classifications, etc. Such a technique may provide improved object predictions and motion planning when compared with systems that choose a single best detection or prediction, and only pass final determined information to other components of the vehicle computing system. Rather than discard information as relating to a less certain output, the system can pass the data with additional probability information to improve downstream operations. In some examples, uncertainty data may be used to adjust the speed and/or defensive driving behavior of an autonomous vehicle. For example, in response to determining that a detected object is associated with a high level uncertainty, the autonomous vehicle may initiate a motion plan to cause the autonomous vehicle to operate at slower speeds until the object's uncertainty is reduced. As yet another example, a region or buffer around a detected object in which the autonomous vehicle will not encroach may be increased in response to higher levels of uncertainty associated with the object.

The systems and methods described herein may provide a particular technical benefit to vehicle computing systems of autonomous vehicles. In particular, a vehicle computing system can generate data indicative of uncertainty with respect to an object detected using one or more machine-learned models. The data indicative of uncertainty can be passed with object detection data to one or more machine-learned models configured for object prediction. The machine-learned models can use the data indicative of uncertainty to generate an improved prediction for the object. Additionally or alternatively, the data indicative of uncertainty associated with the object detection data can be provided to one or more machine-learned models for motion planning. The machine-learned models configured for motion planning can use the data indicative of uncertainty to generate improved motion plans for the autonomous vehicle. The use of uncertainty data may further improve efficiencies in vehicle computing systems for autonomous vehicles. For example, multiple classifications for the same object can be associated with a probability distribution that is passed to a prediction or motion planning system. The downstream system can then use the additional probability information to generate improved predictions or motion plans, rather than discard the already generated data.

With reference now to the Figures, example embodiments of the present disclosure will be discussed in further detail. FIG. 1 depicts a block diagram of an example autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft, rail-based vehicles, etc.).

The autonomous vehicle 10 includes one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 includes a computing device 110 including one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause vehicle computing system 102 to perform operations.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the autonomous vehicle 10. The positioning system can be any device or circuitry for analyzing the position of the autonomous vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object as described. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine one or more motion plans for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at their current and/or future locations.

As one example, in some implementations, the motion planning system 105 can evaluate one or more cost functions for each of one or more candidate motion plans for the autonomous vehicle 10. For example, the cost function(s) can describe a cost (e.g., over time) of adhering to a particular candidate motion plan and/or describe a reward for adhering to the particular candidate motion plan. For example, the reward can be of opposite sign to the cost.

The motion planning system 105 can provide the optimal motion plan to a vehicle controller 106 that controls one or more vehicle controls 107 (e.g., actuators or other devices that control gas flow, steering, braking, etc.) to execute the optimal motion plan. The vehicle controller can generate one or more vehicle control signals for the autonomous vehicle based at least in part on an output of the motion planning system.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

In various implementations, one or more of the perception system 103, the prediction system 104, and/or the motion planning system 105 can include or otherwise leverage one or more machine-learned models such as, for example convolutional neural networks.

Figure 2:
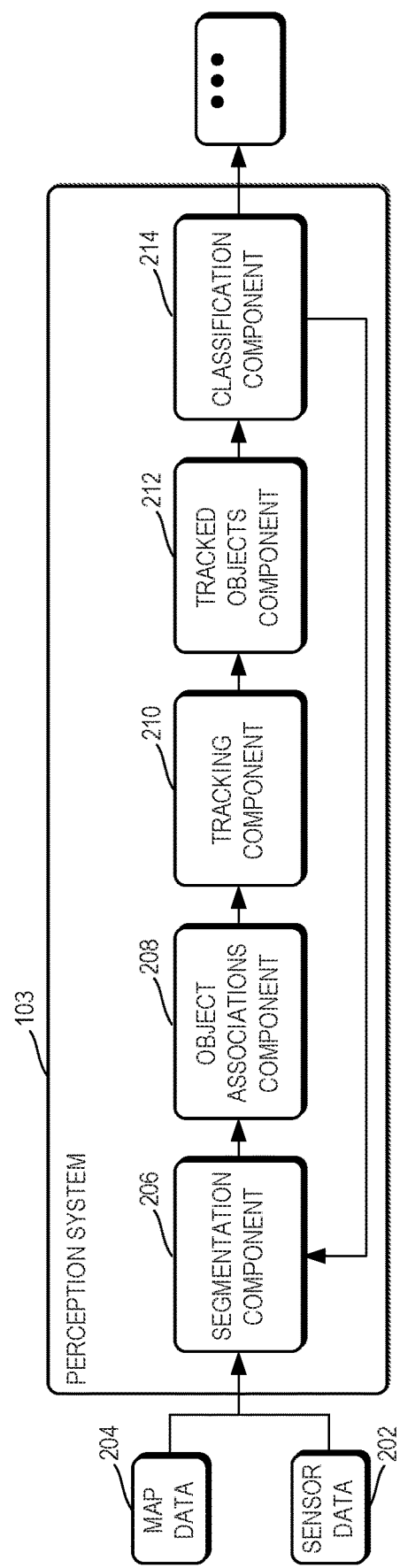
FIG. 2 depicts a block diagram of an example perception system according to example embodiments of the present disclosure.

FIG. 2 depicts a block diagram of an example perception system 103 according to example embodiments of the present disclosure. As discussed in regard to FIG. 1, a vehicle computing system 102 can include a perception system 103 that can identify one or more objects that are proximate to an autonomous vehicle 10. In some embodiments, the perception system 103 can include segmentation component 206, object associations component 208, tracking component 210, tracked objects component 212, and classification component 214. The perception system 103 can receive sensor data 202 (e.g., from one or more sensor(s) 101 of the autonomous vehicle 10) and map data 204 as input. The perception system 103 can use the sensor data 202 and the map data 204 in determining objects within the surrounding environment of the autonomous vehicle 10. In some embodiments, the perception system 103 iteratively processes the sensor data 202 to detect, track, and classify objects identified within the sensor data 202. In some examples, the map data 204 can help localize the sensor data to positional locations within a map data or other reference system.

Within the perception system 103, the segmentation component 206 can process the received sensor data 202 and map data 204 to determine potential objects within the surrounding environment, for example using one or more object detection systems. The object associations component 208 can receive data about the determined objects and analyze prior object instance data to determine a most likely association of each determined object with a prior object instance, or in some cases, determine if the potential object is a new object instance. The tracking component 210 can determine the current state of each object instance, for example, in terms of its current position, velocity, acceleration, heading, orientation, uncertainties, and/or the like. The tracked objects component 212 can receive data regarding the object instances and their associated state data and determine object instances to be tracked by the perception system 103. The classification component 214 can receive the data from tracked objects component 212 and classify each of the object instances. For example, classification component 214 can classify a tracked object as an object from a predetermined set of objects (e.g., a vehicle, bicycle, pedestrian, etc.). The perception system 103 can provide the object and state data for use by various other systems within the vehicle computing system 102, such as the prediction system 104 of FIG. 1.

Figure 3:
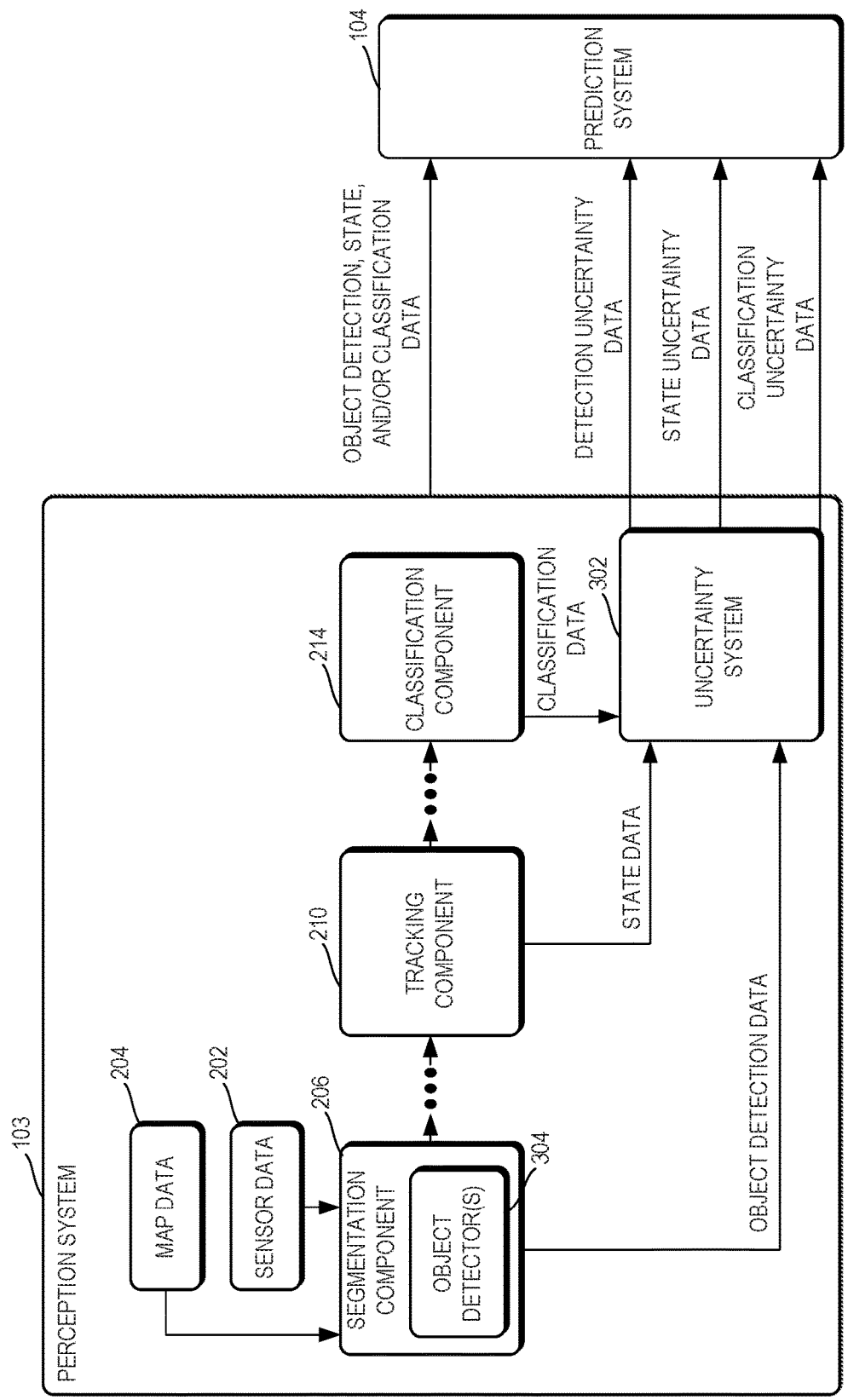
FIG. 3 depicts block diagram of an example perception system and prediction system, including a probability system according to example embodiments of the present disclosure.

FIG. 3 is a block diagram depicting an example of a vehicle computing system including an uncertainty system in accordance with example embodiments of the present disclosure. FIG. 3 depicts a subset of components of an example vehicle computing, namely a perception system 103 and prediction system 104. Perception system 103 includes an uncertainty system 302 in accordance with example embodiments of the disclosed technology.

Uncertainty system 302 is configured to generate uncertainty data in association with one or more outputs of preception system 103. Uncertainty system 302 receives data indicative of one or more detected objects. The data indicative of one or more objects may include object detection data from segmentation component 206, state data from tracking component 210, and/or classification data from classification component 214.

Object detection data generated by segmentation component 206 may include data indicative of an object detection. The data may indicate the presence of one or more detected objects in an environment external to the autonomous vehicle. In some examples, the data may be based on a number of points in sensor data indicating the presence of the object. By way of example, the object detection data may indicate the presence or existence of a vehicle, pedestrian, bicycle, or other object type. In some examples, segmentation component 206 may include one or more object detectors 304 configured to generate object detection data. Each object detector 304 may include one or more machine-learned models configured to generate object detection data based on input sensor data 202.

State data generated by tracking component 210 may include data indicative of the state of one or more detected objects. The data may indicate state information associated with the one or more detected objects. By way of example, state data may include data relating to an object's position, velocity, acceleration, heading, orientation, size or other information relative to an object's current state. In some examples, tracking component 210 may include one or more tracking models configured to generate state data for detected objects. Each tracking model may include one or more machine-learned models configured to generate state data for one or more object detections. The tracking models may combine information from multiple cycles or frames of sensor data as part of determining object state information.

Classification data generated by classification component 214 may include data indicative of a classification of one or more detected objects. By way of example, classification data may include data indicating whether a detected object is a vehicle, pedestrian, bicycle, or other classification of object encountered in the environment of an autonomous vehicle. In some examples, classification component 214 may include one or more classification models configured to generate classification data for detected objects. Each classification model may include one or more machine-learned models configured to generate classification data for one or more object detections.

Uncertainty system 302 is configured to generate uncertainty data in association with each of the received outputs of the perception system. Uncertainty system 302 can generate detection uncertainty data in association with object detection data generated by segmentation component 206. Uncertainty system 302 can generate state uncertainty data in association with state data generated by tracking component 210. Uncertainty system 302 can generate classification uncertainty data in association with classification data generated by classification component 214. The various uncertainty data can be generated based on one or more of input object detection data, state data, or classification data. For example, detection uncertainty data can be based not only on object detection data but state data and classification data as well. Detection uncertainty data, state uncertainty data, and classification uncertainty data can be provided to prediction system 104. Prediction system 104 can utilize the uncertainty data along with the object detection data, state data and classification data in order to generate more accurate and reliable predictions associated with the detected objects.

Although FIG. 3 illustrates the uncertainty data being passed from perception system 103 to prediction system 104, the uncertainty data may be passed within perception system 103 as well. For example, detection uncertainty data may be passed from uncertainty system 302 into tracking component 210 to be used as part of object tracking. A highly calibrated uncertainty can be generated for the output of an object detector 304. For instance, an object detector 304 may include one or more convolutional neural networks configured to generate object detections based on a LIDAR image. An uncertainty may be calculated for an object detection generated from the convolutional neural network and passed to tracking component 210. In turn, improved uncertainty modeling can be provided for the output of tracking component 210. The output of tracking component 210 can be associated with uncertainty of the various parameters of state of a detected object such as position, heading, shape, velocity, acceleration, etc.

Uncertainty system 302 may calculate uncertainty in association with object detection data, state data, and/or classification data using various techniques. For example, uncertainty system 302 may determine uncertainty for a detected object based on one or more of an object state, an object history, a local context associated with an object, and/or a global context associated with an object.

The state information can be used with history data associated with object detections to determine an uncertainty with respect to whether an object detection is an actual object. The history of an object can be examined to choose those object detections that have a history of good prediction and/or low uncertainty in some examples. History information may include one or more previous object detections that are used to assess an uncertainty for a current object detection. Additionally, a history of the uncertainty associated with an object can be used. The length of time or number of cycles associated with an object detection and/or tracking can be used as part of a current object detection and uncertainty determination. The system may use a classification or state associated with an object from a previous cycle as part of determining the classification or state of the object for a current cycle. In some examples, the uncertainty system may be configured to increase the uncertainty associated with an object if its classification or state changes between cycles, as this may be indicative of a lack of certainty in the detection or prediction.

A predetermined number of previous states of an object can be stored and used to determine uncertainty associated with the object. Each of the stored states can be passed to the prediction system. The use of historical features can enable improved prediction. A predetermined number of future states can be forward simulated and passed as a placeholder to be used for predicting trajectories using instance flow. Historical determinations and future predictions can be used to modify an uncertainty associated with an object. For instance, the uncertainty or previous state information can be modified to be consistent with a full object trajectory. By analyzing a trajectory, a determination can be made as to what degree an object detection should be trusted by downstream components.

A local context, such as consistency or disagreement between detectors, can be used to determine uncertainty of detected object. Uncertainty system 302, for example, may generate uncertainty data based on the outputs of multiple object detectors within segmentation component 206. Rather than select the output of one object detector, multiple outputs or a fused output of each detector can be passed from the perception system. Uncertainty system 302 can calculate an uncertainty value for each output and pass the uncertainty data with the underlying object detection data. In some examples, the uncertainty data may include a probability for each of the outputs. The system may use a concurrence between the output of multiple pipelines to increase the uncertainty associated with an object detection or a disagreement between outputs to decrease the uncertainty.

A global context associated with a detected object may also be used as part of determining uncertainty. The system may use an object's position or locality with respect to the vehicle and/or a number of points in sensor data corresponding to the object to determine an uncertainty associated with the object. Object detections at far range may be considered relatively trustworthy even when a small number of sensor data points are obtained for the object. By contrast, object detections at close range may be considered relatively untrustworthy when a small number of sensor data points are obtained for the object. Map data can also be used. For example, map data may indicate whether an object detection is consistent with a global context of an environment external to the vehicle. In some instances, the map data is used independently of detection to provide an assessment of the consistency of a detection with the map data. Map information may be used with statistics associated with objects in a scene to gather information (e.g., using a graph structure) in order to provide uncertainty information associated with the objects.

It is noted that uncertainty system 302 may not receive all of the depicted data in all embodiments. Uncertainty system 302 may receive one or more of object detection data, state data, or classification data in various examples. Additionally, uncertainty system 302 may receive additional data such as object association data and/or tracked objects data. Similarly, uncertainty system 302 may not generate uncertainty data for all of the received outputs in some examples. Uncertainty system 302 may generate uncertainty data for one or more of the object detection data, state data, or classification data in various examples.

Although uncertainty system 302 is implemented as part of perception system 103 in FIG. 3, uncertainty system 302 may be implemented in other manners according to various embodiments. By way of example, uncertainty system 302 may be implemented separately from perception system 103. In another example, uncertainty system may include one or more portions implemented within one or more components of the perception system, such as within segmentation component 206, tracking component 210, and/or classification component. In yet another example, uncertainty system 302 may be at least partially implemented within prediction system 104 or another system of the vehicle computing system.

Figure 4:
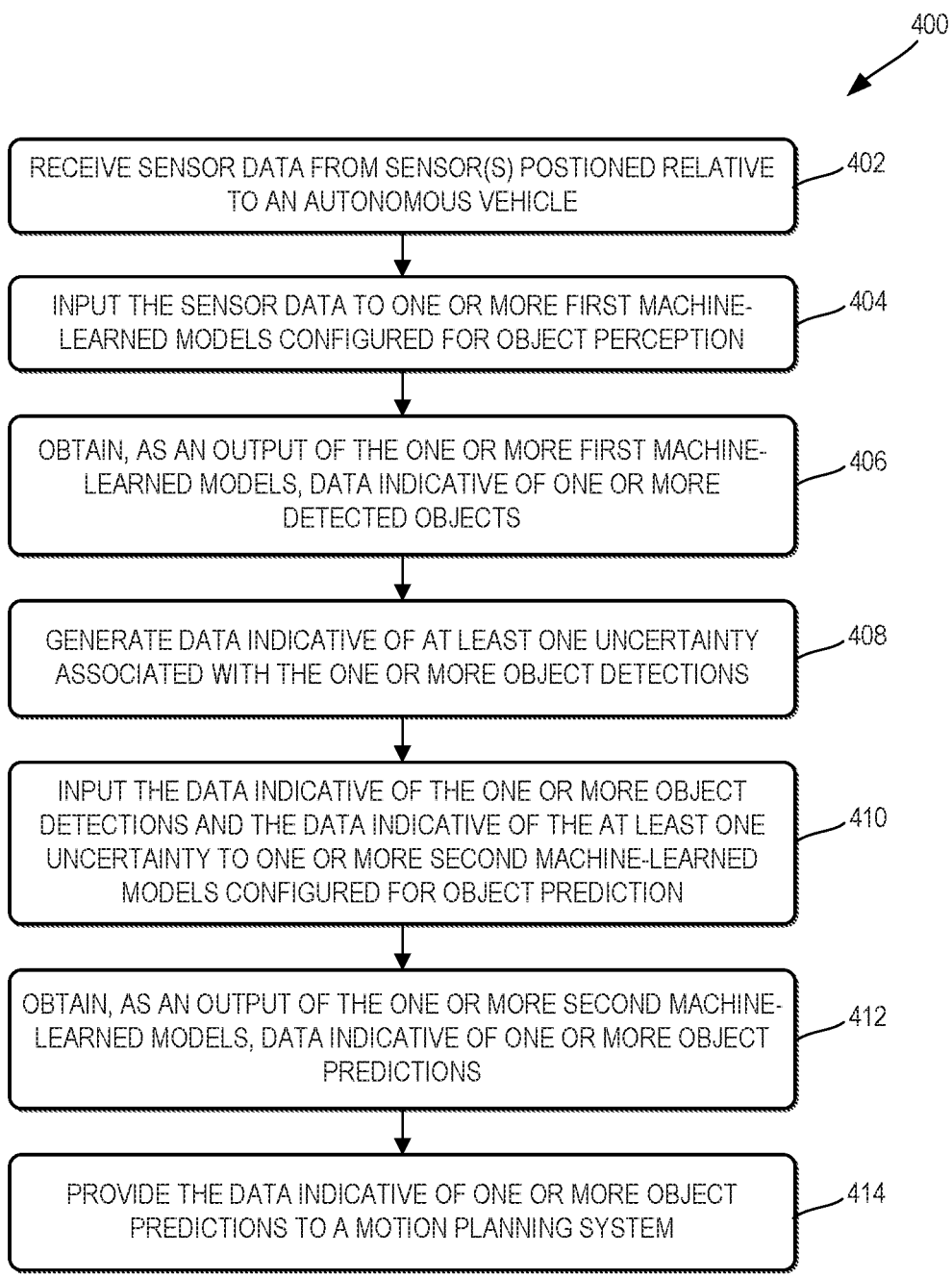
FIG. 4 depicts a flowchart diagram of an example process of generating data indicative of uncertainty associated with object detections and providing the data indicative of uncertainty downstream for object prediction and/or motion planning according to example embodiments of the present disclosure.

FIG. 4 is a flowchart diagram depicting an example process 400 of generating and using uncertainty data within a vehicle computing system as part of controlling an autonomous vehicle. One or more portions of process 400 (and other processes described herein) can be implemented by one or more computing devices such as, for example, the computing devices 110 within vehicle computing system 102 of FIG. 1, or example computing system 1000 of FIG. 10. Moreover, one or more portions of the processes described herein can be implemented as an algorithm on the hardware components of the devices described herein (e.g., as in FIGS. 1 and 10) to, for example, generate data indicative of uncertainty and generate motions plans for an autonomous vehicle using the data. In example embodiments, process 400 may be performed by an uncertainty system 302 of vehicle computing system 102.

At 402, sensor data is received from one or more sensors positioned relative to an autonomous vehicle. By way of example, sensor data may include one or more of image sensor data, RADAR sensor data, and/or LIDAR sensor data. It will be appreciated, however, that any type of sensor data may be utilized in accordance with embodiments of the disclosed technology.

At 404, the sensor data is input to one or more first machine-learned models configured for object perception. For example, the one or more first machine-learned models may be object detector models provided as part of a segmentation component of a perception system. In other examples, the one or more first machine-learned models may be associated with one or more of object tracking and/or object classification.

At 406, data indicative of one or more detected objects is obtained as an output of the one or more first machine-learned models. The data may be one or more of object detection data, state data, or classification data associated with the one or more detected objects.

At 408, data indicative of at least one uncertainty is generated in association with the one or more object detections. The uncertainty data may include detection uncertainty data, state uncertainty data, and/or classification uncertainty data. The uncertainty data may be generated using object state information, object history information, a local context associated with one or more detected objects, and/or a global context associated with the one or more detected objects. The uncertainty data may be data indicative of probability associated with the one or more object detections in some examples. By way of example, the system may generate two or more classifications for a detected object and assign a probability to each of the two or more classifications.

At 410, data indicative of the one or more object detections is input to one or more second machine-learned models configured for object prediction. Additionally, the data indicative of the at least one uncertainty is input to the one or more second machine-learned models.

At 412, data indicative of one or more object predictions is obtained as an output of the one or more second machine-learned models. For example, the data may include predicted state data for one or more detected objects, such as a predicted position, velocity, and/or trajectory of an object. The object prediction data may be generated based at least in part on the uncertainty input with the data indicative of the one or more object detections. By way of example, an object predicted trajectory may be generated based on the uncertainty associated with the classification of the object. In another example, multiple predicted trajectories may be generated based on multiple classifications for a detected object and probabilities passed in association with each of the classifications.

At 414, the data indicative of one or more object predictions is provided to a motion planning system of the autonomous vehicle. The motion planning system can generate one or more motion plans based on one or more object predictions.

It is noted that while the uncertainty in FIG. 4 is passed to the object prediction system as part of generating one or more object predictions, the uncertainty data may be used in other manners. By way of example, uncertainty data may be generated in association with one or more object detections from a segmentation component. The uncertainty data may be passed with the object detection data to the tracking component and/or classification component of the perception system to be used as part of object tracking and object classification.

Figure 5:
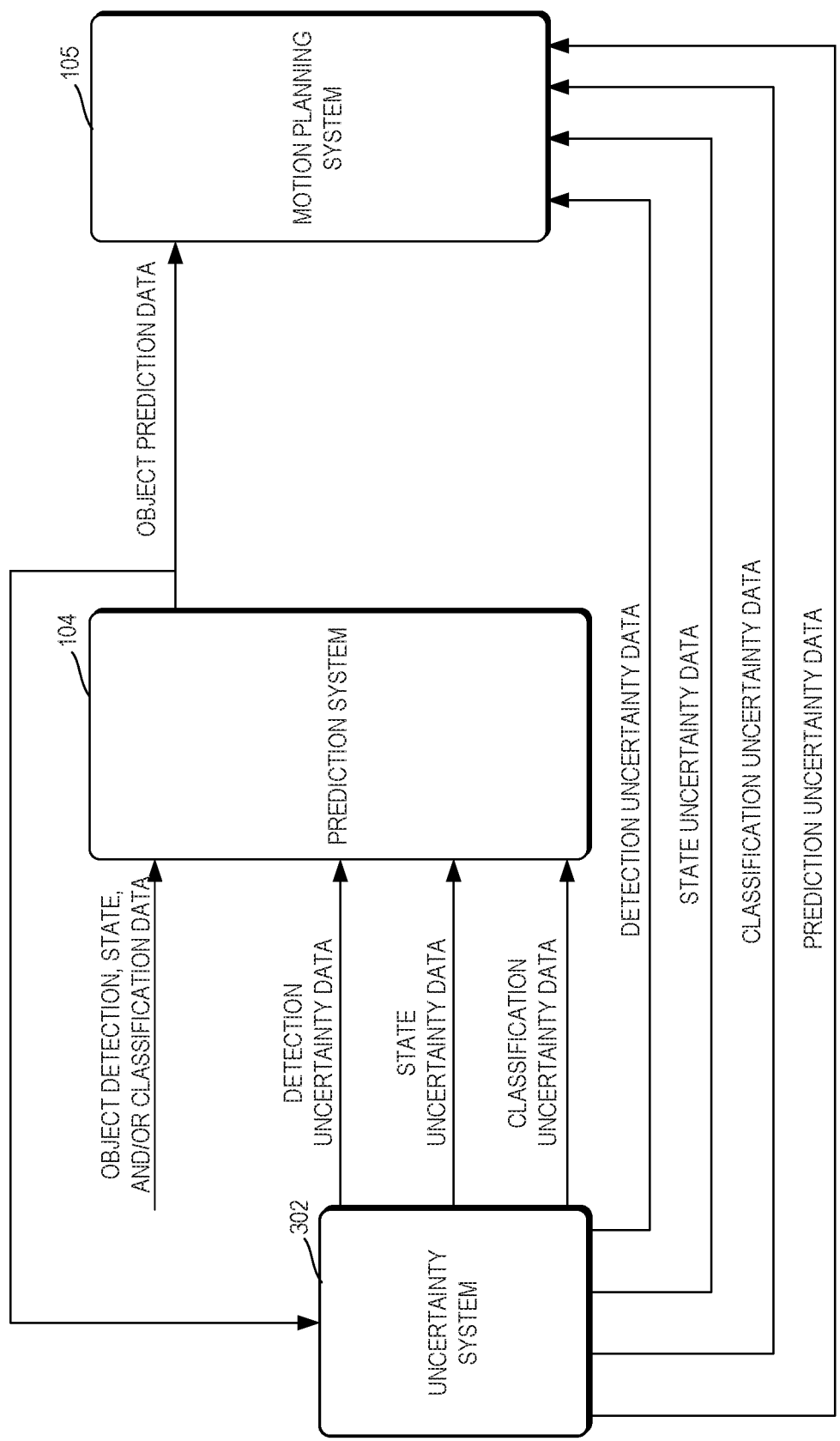
FIG. 5 depicts block diagram of an example prediction system and motion planning system, including a probability system according to example embodiments of the present disclosure.

FIG. 5 is a block diagram depicting an example of a vehicle computing system including an uncertainty system in accordance with another example embodiment of the present disclosure. FIG. 5 depicts a variation of the uncertainty system 302 from FIG. 3 in which uncertainty data is provided directly to the motion planning system 105. Additionally, the uncertainty system receives one or more outputs of the prediction system 104 and generates additional prediction uncertainty data. The prediction uncertainty data can be provided from uncertainty system 302 to the motion planning system 105 along with detection uncertainty data, state uncertainty data, and classification uncertainty data.

Prediction uncertainty data can include data indicative of one or more uncertainties associated with predictions generated by prediction system 104. By way of example, prediction uncertainty data may include an uncertainty value associated with a predicated state of a detected object. The uncertainty may be an uncertainty with respect to a predicted position, velocity, acceleration, trajectory, etc. associated with a detected object. Various uncertainty value types may be used. For example, the uncertainty value can be a probability associated with a prediction generated by prediction system 104. In some examples, the probability can be a probability distribution associated with a prediction. For instance, the prediction system may generate two or more object predictions (e.g., multiple positions) and provide a probability distribution for the multiple predictions. The motion planning system 105 can then use the object predictions and probability information as part of generating motion plans for the autonomous vehicle.

Figure 6:
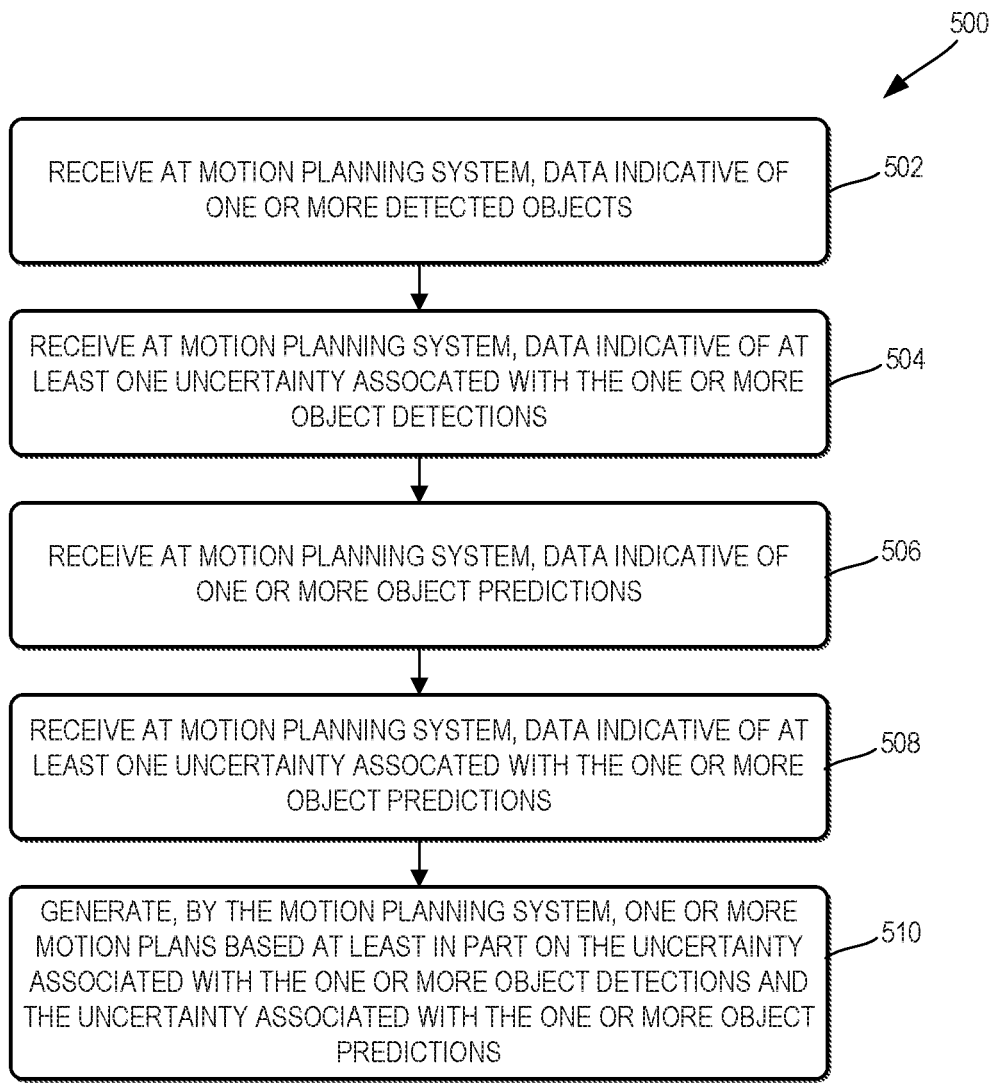
FIG. 6 depicts a flowchart diagram of an example process of generating motion plans for an autonomous vehicle based on data indicative of uncertainty according to example embodiments of the present disclosure.

FIG. 6 is a flow chart diagram depicting an example process 500 for generating a motion plan based at least in part on uncertainty data associated with object detections in accordance with example embodiments of the disclosed technology. In some examples, process 500 may be performed by an uncertainty system 302 of vehicle computing system 102.

At 502, data indicative of one or more detected objects is received at the motion planning system. The data indicative of one or more detected objects may include object detection data, state data, and/or classification data.

At 504, data indicative of at least one uncertainty associated with one or more object detections is received at the motion planning system. The data indicative of at least one uncertainty may include detection uncertainty data, state uncertainty data, and/or application uncertainty data.

At 506, data indicative of one or more object predictions is received at the motion planning system. The data indicative of one or more object predictions may include predicted state data in some examples. For example, the predicted state data may include a predicted position, a predicted velocity, a predicted acceleration, a predicted trajectory, and/or other object prediction data.

At 508, data indicative of at least one uncertainty associated with the one or more object predictions is received at the motion planning system. The data indicative of at least one uncertainty associated with the one or more object predictions may include state uncertainty data in some examples. The state uncertainty data may include an uncertainty associated with a predicted position, a predicted velocity, a predicted acceleration, a predicted trajectory, and/or other object predictions.

At 510, one or more motion plans are generated by the motion planning system. The one or more motion plans are generated based at least in part on the uncertainty associated with the one or more object detections and the uncertainty associated with one or more object predictions. It is noted, however, that in some examples motion plans may be generated using only uncertainty associated with one or more object detections or uncertainty associated with one or more object predictions. Moreover, in some examples, object detection data may not be received directly by the motion planning system. Rather the object detection data may be processed by the prediction system which passes one or more object predictions to the motion planning system which generates a motion plan based only on the output of the prediction system.

By way of example, uncertainty data may be used to detect gridlock or other traffic patterns associated with one or more travelways. Rather than requiring the use of true object detections only in such determining gridlock, data indicative of object detections and data indicative of uncertainty associate with object detections can be passed downstream for use in informing one or more systems for identifying a traffic pattern. In this manner, such information can be used even if the information is not used to predict the motion of such objects.

In some examples, data associated with one or more detected objects may be used by prediction system 104 to model continuous state predictions. This may be done using continuous values for uncertainties that are provided from uncertainty system. Passing along such values to the prediction system may facilitate the modeling of continuous state predictions.

In some examples, uncertainty data may be used as part of speed regression and/or defensive driving techniques for an autonomous vehicle. For example, if a perceived scene contains many uncertain objects the motion planning system can learn or shift to discrete driving modes to be able to be more defensive around uncertain or confusing situations. This may include slowing down around erratic predictions, switching to another lane when uncertain pedestrians are close to the road, switching to another lane or slowing down whenever an uncertain large vehicle is passing, when the autonomous vehicle is in the blind spot of another vehicle, or other processes.

In some examples, the use of uncertainty data may be used in generating motion plans in an uncertain cost space. Uncertainty data may be associated with object detections and then used in motion planning. For example using uncertainty in motion planning may allow the creation of a probabilistic padding around objects. For example, there may be a higher cost for moving toward objects that have a higher uncertainty. Such a technique may be used where the cost space is highly non-convex. The technique can be integrated as a way to only inflate the cost of those objects without adding the padding in the direction of uncertainty.

Figure 7:
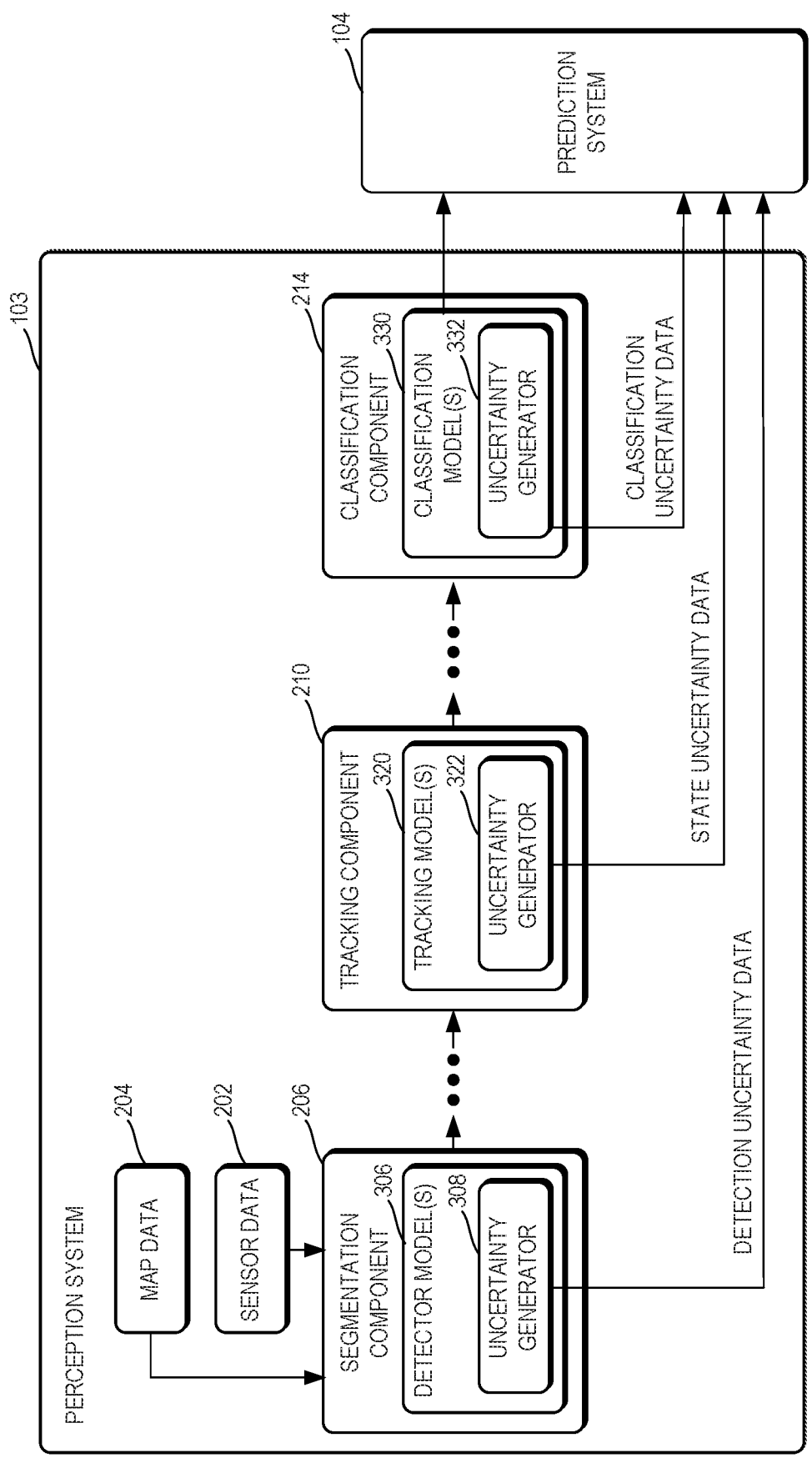
FIG. 7 depicts a block diagram of an example perception system and prediction system, including probability generators integrated within machine-learned models of the perception system according to example embodiments of the present disclosure.

FIG. 7 is a block diagram depicting an example of a vehicle computing system including an uncertainty system in accordance with another example embodiment of the present disclosure. FIG. 7 depicts a variation in which the uncertainty system includes uncertainty generators 308, 322, and 332 provided directly within various components of the perception system. Segmentation component 206 includes one or more detector models 306. The one or more detector models can include one or more machine-learned models configured to generate object detection data. One or more of the detector models 306 may include an uncertainty generator 308. Uncertainty generator 308 may be configured as part of a machine-learned model for object detection. In this manner, a machine-learned detector model may generate object prediction data as well as detection uncertainty data associated with the object detections.

Tracking component 210 includes one or more tracking models 320. The tracking models can include one or more machine-learned models configured to generate object state data. One or more of the tracking models 320 may include an uncertainty generator 322. Uncertainty generator 322 may be configured as part of a machine-learned model for object tracking. In this manner, a machine-learned tracking model may generate object state data as well as state uncertainty data associated with the object state.

Classification component 214 includes one or more classification models 330. The classification models can include one or more machine-learned models configured to generate object classification data. One or more of the classification models 330 may include an uncertainty generator 332. Uncertainty generator 332 may be configured as part of a machine-learned model for object classification. In this manner, a machine-learned classification model may generate object classification data as well as classification uncertainty data associated with the object classifications.

Figure 8:
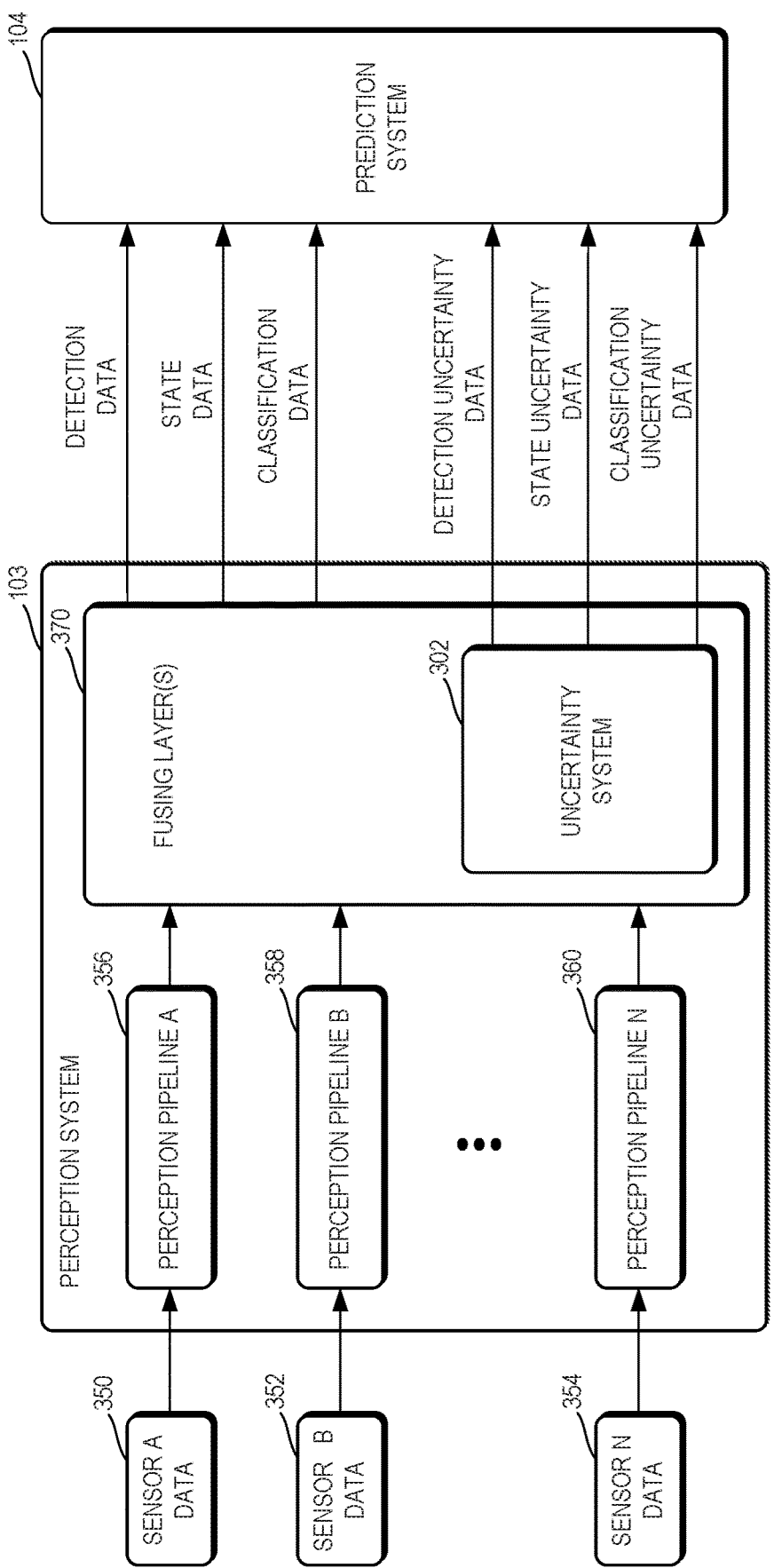
FIG. 8 depicts a block diagram of an example perception system including one or more fusing layers in which a probability generator is integrated according to example embodiments of the present disclosure.

FIG. 8 is a block diagram depicting an example of a vehicle computing system including an uncertainty system in accordance with another example embodiment of the present disclosure. FIG. 8 depicts a variation in which the uncertainty system is implemented within one or more fusing layers 370 of the perception system 103.

Fusing layers 370 are in communication with a plurality of perception pipelines 356, 358, and 360 which are each configured to process sensor A data 350, sensor B Data, and sensor N data, respectively. The one or more fusing layers may fuse multiple perception outputs associated with different sensors of the autonomous vehicle. For example, sensor A data 350 may be associated with one or more first sensors, sensor B data 352 may be associated with one or more second sensors, and sensor N data may be associated with one or more third sensors. The sensor data associated each sensor may be processed using a perception pipeline including an individual set of machine-learned models for object detection, object tracking, and/or object classification. Perception pipeline A 356, for example, may receive sensor data from the one or more first sensors and perform object segmentation, object association, tracking, and/or classification. As such, each perception pipeline may include one or more of the components as illustrated in FIG. 2 as part of perception system 103.

Fusing layers 370 may receive the output of each perception pipeline and generate detection data, state data, and/or classification data based on the outputs of each of the perception pipelines. The fusing layers, in some instances, may select the output of a particular perception pipeline. For example, a first perception pipeline may assign a first classification to a detected object while a second perception pipeline may assign a second classification to detect detected object. Fusing layers 370 may implement any number of techniques for selecting amongst the outputs of each perception pipeline. Uncertainty system 302 may assign an uncertainty to the selected output.

In accordance with embodiments of the present disclosure, fusing layers 370 may pass data indicative of one or more detected objects from multiple perception pipelines to prediction system 104. For example, fusing layers 370 may pass a classification from perception pipeline A 356 to prediction system 104 as well as another classification for the same object from perception pipeline B 358 to prediction system 104. Uncertainty system 302 may assign an uncertainty to each of the classifications provided to the prediction system. For example, uncertainty system 302 may generate a probability distribution associated with multiple classifications and provide the probability distribution along with the multiple classifications to the prediction system. Similarly, the fusing layers may in such instances, generate uncertainty data such as probability distributions for the multiple outputs associated with the same detected object.

Figure 9:
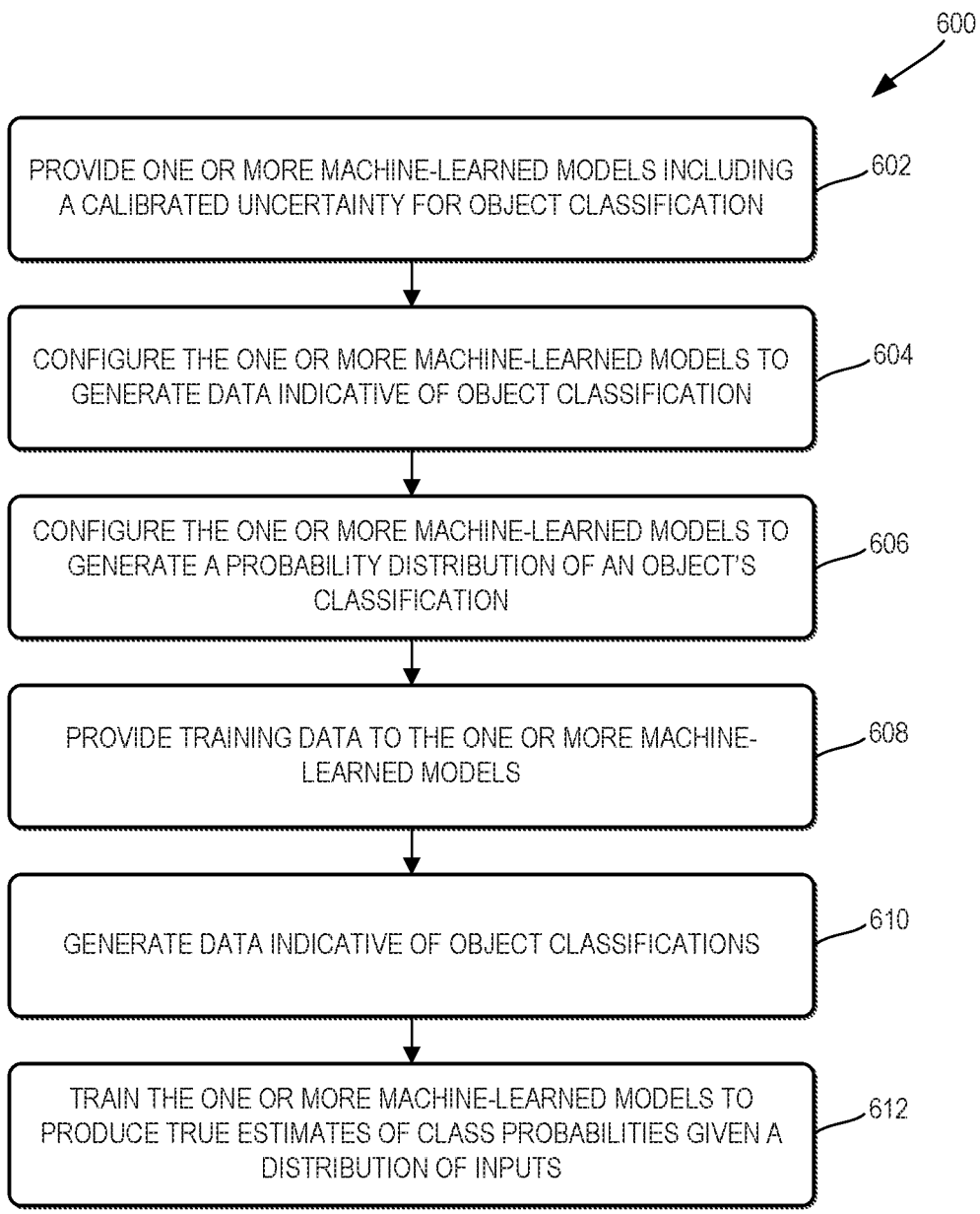
FIG. 9 is a flowchart diagram of an example process of training a machine-learned model to generate true estimates of class probabilities for detected objects in example embodiments of the present disclosure.

FIG. 9 is a flow chart diagram depicting an example process 600 for providing a machine-learned model to generate uncertainty data in association with object classification of a perception system. In some examples, process 600 may be performed by an uncertainty system 302 of vehicle computing system 102. While process 600 is depicted with respect to object classification, it will be appreciated that similar processes may be used to provide machine-learned models for object tracking or object classification, for example.

At 602, one or more machine-learned models are provided that include a calibrated uncertainty for object classification. At 604, the one or more machine-learned models are configured to generate data indicative of an object classification. At 606, the one or more machine-learned models are configured to generate a probability distribution of an object classification.

In example embodiments, the one or more machine-learned models may be a classifier that is configured to analyze the joint probability of all classes given a set of input data. For example, a generative classifier can be used in some examples. More particularly, by way of example, a Gaussian naive Bayes classifier may be used. Such a classifier may make use of Bayes rule and a conditional independence assumption of the input features to calculate probabilities in a simple fashion. In some examples, a Bayesian generative classifier such as a Gaussian naive Bayes classifier can be provided and have a calibrated uncertainty value.

A generative classifier can produce a real probability distribution of a class given the input data. The use of a classifier that produces a real probability distribution may be contrasted with discriminative classifiers that use stochastic gradient descent (SGT) in order to minimize an arbitrary loss function. Such classifiers provide a loss function that is designed to push the distribution on the class probabilities from the model to as close to possible as the ground truth. The result of such a classifier may be to cause the distribution produced by the classifier to be very close to either zero or one depending on the true class. By contrast, a Bayesian generative classifier may analyze the underlying data and produce a true estimate of the probabilities given the distribution of inputs seen during training time.

At 608, training data is provided to the one or more machine-learned models. The training data may include ground truth data. The training data may include labels indicating a class with which the training data is associated.

At 610, data indicative of one or more object classifications is generated using the one or more machine-learned models. At 612, the one or more machine-learned models are trained to produce true estimates of class probabilities given a distribution of inputs. The model(s) can be trained by comparing an output of the machine-learned with the ground-truth data and backpropagating errors, for example. In some examples, training a generative classifier may be performed in a single pass through the training data, as compared with discriminative classifiers that may require multiple passes to achieve optimization. The model(s) may be trained to provide an in-depth statistical analysis of the objects and may provide a way to pick the heuristic values on uncertainty while analyzing a large set of objects. In some examples, the generative classifier can relax some assumptions and learn a nonlinear decision surface. In some instances, the classifier can be detector agnostic. Because it is analyzing many conditional probabilities on a binary class, certain features may not show up. The distribution on the values of the input features can be extended to be a condition of the detection type as well as the class type One or more machine-learned models trained to generate uncertainty data in accordance with example embodiments may provide a continuous probability of uncertainty to the prediction system 104. Such a model may be able to process the state, history, local, and global information inside of one or more fusing layers.

In some examples, Bayesian hierarchal modeling may be additionally used. For example one approach may regress values for object detection as shown in Equation 1.

$$p(\text{true detection} | \sigma_{state}, \sigma_{history}, \sigma_{local}, \sigma_{global}) \quad \text{Equation 1}$$

A Gaussian naïve Bayes approach may treat the parameters $\sigma\_state$, $\sigma\_history$, $\sigma\_local$, $\sigma\_global$ as conditionally independent with respect to a true detection. The output can be modeled as a binomial distribution. The relationships between these parameters can be modeled in some examples using hierarchical Bayesian methods.

Figure 10:
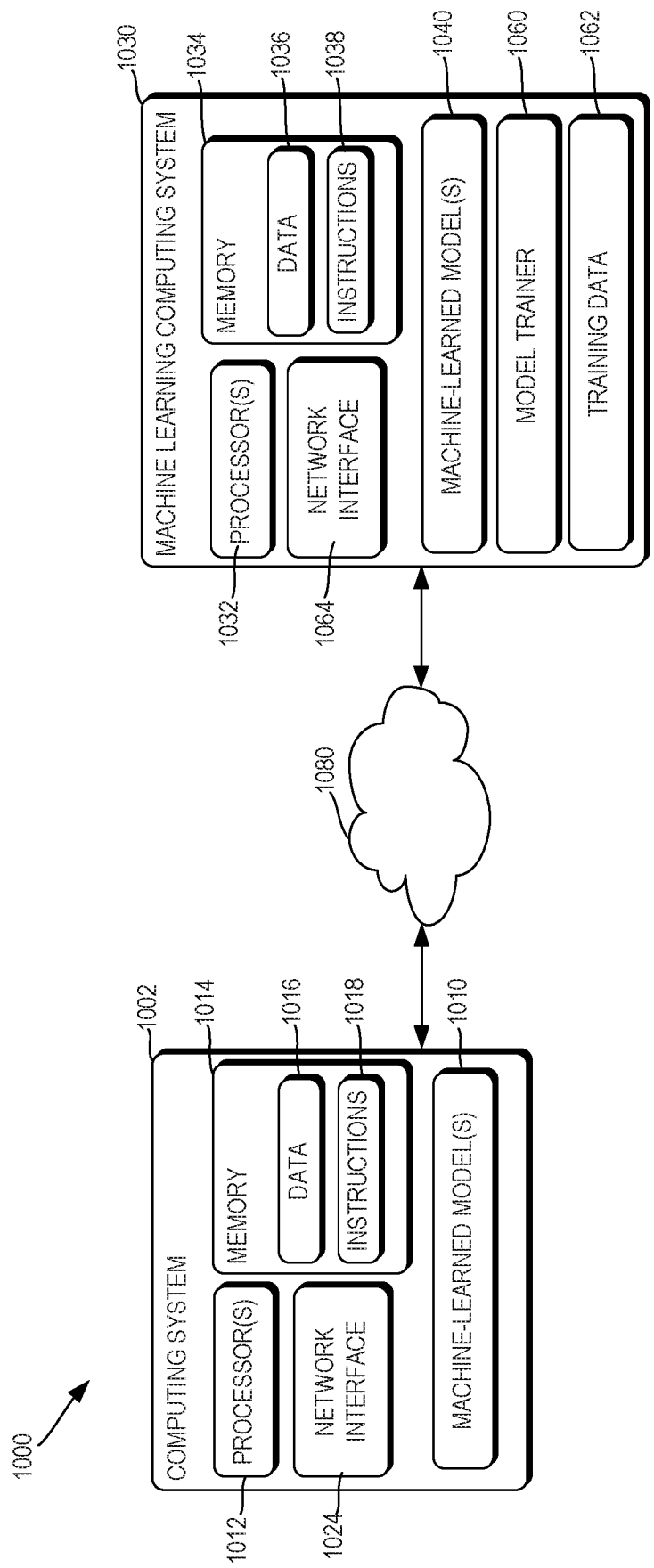
FIG. 10 depicts a block diagram of an example computing system according to example embodiments of the present disclosure.

Uncertainty data may be integrated with Deep prediction in some examples. Deep prediction may make use of information such as other objects in a scene, map information, etc. A regression of the true probability distribution can be regressed directly from deep prediction while adding such additional information including shifting of the state distribution. Such a technique may allow the prediction to be performed within perception system 103 where it may have more contextual information such as other detections, sensor information from the detector, etc. This may permit reducing the amount of code and time overhead of integrating an additional machine-learned model FIG. 10 depicts a block diagram of an example computing system 1000 according to example embodiments of the present disclosure. The example computing system 1000 includes a computing system 1002 and a machine learning computing system 1030 that are communicatively coupled over a network 1080.

In some implementations, the computing system 1002 can perform uncertainty data determination processes and use uncertainty data as part of autonomous vehicle operations. In some implementations, the computing system 1002 can generate uncertainty data using a machine-learned model. In some implementations, the computing system 1002 can be included in an autonomous vehicle. For example, the computing system 1002 can be on-board the autonomous vehicle. In some embodiments, computing system 1002 can be used to implement vehicle computing system 102. In other implementations, the computing system 1002 is not located on-board the autonomous vehicle. For example, the computing system 1002 can operate offline to obtain sensor data and perform uncertainty data generation. The computing system 1002 can include one or more distinct physical computing devices.

The computing system 1002 includes one or more processors 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can store data 1016 that can be obtained, received, accessed, written, manipulated, created, and/or stored. The data 1016 can include, for instance, image or other sensor data captured by one or more sensors, machine-learned models, etc. as described herein. In some implementations, the computing system 1002 can obtain data from one or more memory device(s) that are remote from the computing system 1002.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processors 1012 cause the one or more processors 1012 to perform any of the operations and/or functions described herein, including, for example, generating machine-learned models, generating uncertainty data, etc.

According to an aspect of the present disclosure, the computing system 1002 can store or include one or more machine-learned models 1010. As examples, the machine-learned models 1010 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1002 can receive the one or more machine-learned models 1010 from the machine learning computing system 1030 over network 1080 and can store the one or more machine-learned models 1010 in the memory 1014. The computing system 1002 can then use or otherwise implement the one or more machine-learned models 1010 (e.g., by processor(s) 1012). In particular, the computing system 1002 can implement the machine-learned model(s) 1010 to generate uncertainty data for object detections, predictions, and motion plan generation based on sensor data.

The machine learning computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof. In some embodiments, machine learning computing system 1030 can be used to implement vehicle computing system 102.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, machine-learned models and flow graphs as described herein. In some implementations, the machine learning computing system 1030 can obtain data from one or more memory device(s) that are remote from the machine learning computing system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032.

For example, the memory 1034 can store instructions 1038 that when executed by the one or more processors 1032 cause the one or more processors 1032 to perform any of the operations and/or functions described herein, including, for example, generating uncertainty data and controlling an autonomous vehicle based on data indicative of uncertainty associated with detection objects external to the autonomous vehicle.

In some implementations, the machine learning computing system 1030 includes one or more server computing devices. If the machine learning computing system 1030 includes multiple server computing devices, such server computing devices can operate according to various computing architectures, including, for example, sequential computing architectures, parallel computing architectures, or some combination thereof.

In addition or alternatively to the machine-learned model(s) 1010 at the computing system 1002, the machine learning computing system 1030 can include one or more machine-learned models 1040. As examples, the machine-learned models 1040 can be or can otherwise include various machine-learned models such as, for example, neural networks (e.g., deep neural networks) or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1030 can communicate with the computing system 1002 according to a client-server relationship. For example, the machine learning computing system 1030 can implement the machine-learned models 1040 to provide a web service to the computing system 1002. For example, the web service can generate uncertainty data in response to sensor data and/or other data received from an autonomous vehicle.

Thus, machine-learned models 1010 can located and used at the computing system 1002 and/or machine-learned models 1040 can be located and used at the machine learning computing system 1030.

In some implementations, the machine learning computing system 1030 and/or the computing system 1002 can train the machine-learned models 1010 and/or 1040 through use of a model trainer 1060. The model trainer 1060 can train the machine-learned models 1010 and/or 1040 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1010 and/or 1040 based on a set of training data 1062. The training data 1062 can include, for example, ground truth data including annotations for sensor data portions and/or vehicle state data. The model trainer 1060 can be implemented in hardware, firmware, and/or software controlling one or more processors.

In some examples, the model trainer 160 can train a machine-learned model 1010 and/or 1040 configured to generate uncertainty data in association with detected objects. In some examples, the machine-learned model 1010 and/or 1040 is trained using sensor data that has been labeled or otherwise annotated as having a correspondence to a detected object, a class of a detected object, etc. By way of example, sensor data collected in association with a particular class of object can be labeled to indicate that it corresponds to an object detection or the particular class. In some instances, the label may be a simple annotation that the sensor data corresponds to a positive training dataset.

The computing system 1002 can also include a network interface 1024 used to communicate with one or more systems or devices, including systems or devices that are remotely located from the computing system 1002. The network interface 1024 can include any circuits, components, software, etc. for communicating with one or more networks (e.g., 1080). In some implementations, the network interface 1024 can include, for example, one or more of a communications controller, receiver, transceiver, transmitter, port, conductors, software and/or hardware for communicating data. Similarly, the machine learning computing system 1030 can include a network interface 1064.

The network(s) 1080 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 10 illustrates one example computing system 1000 that can be used to implement the present disclosure. Other computing systems can be used as well. For example, in some implementations, the computing system 1002 can include the model trainer 1060 and the training data 1062. In such implementations, the machine-learned models 1010 can be both trained and used locally at the computing system 1002. As another example, in some implementations, the computing system 1002 is not connected to other computing systems.

In addition, components illustrated and/or discussed as being included in one of the computing systems 1002 or 1030 can instead be included in another of the computing systems 1002 or 1030. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of detecting objects of interest, comprising:
    inputting sensor data to one or more first machine-learned models that detect objects external to an autonomous vehicle;
    obtaining, as an output of the one or more first machine-learned models, data indicative of one or more detected objects external to the autonomous vehicle;
    determining data indicative of at least one uncertainty associated with the one or more detected objects at a current cycle, wherein the data indicative of the at least one uncertainty is determined based on the data indicative of the one or more detected objects and history data associated with the one or more detected objects at a previous cycle;
    inputting the data indicative of the one or more detected objects and the data indicative of the at least one uncertainty associated with the one or more detected objects to one or more second machine-learned models that generate predictions in association with objects external to the autonomous vehicle; and
    obtaining, as an output of the one or more second machine-learned models, data indicative of at least one prediction associated with the one or more detected objects, the at least one prediction based at least in part on the one or more detected objects and the at least one uncertainty.

2. The computer-implemented method of claim 1, further comprising:
    inputting the data indicative of the at least one uncertainty associated with the one or more detected objects and the data indicative of the at least one prediction associated with the one or more detected objects to one or more third machine-learned models that generate motion plans in association with the autonomous vehicle.

3. The computer-implemented method of claim 2, further comprising:
    obtaining as an output of the one or more third machine-learned models, data indicative of at least one motion plan based on the one or more detected objects.

4. The computer-implemented method of claim 3, further comprising:
    controlling the autonomous vehicle based at least in part on the at least one motion plan.

5. The computer-implemented method of claim 3, wherein:
    the data indicative of the at least one motion plan is generated by the one or more third machine-learned models based at least in part on the data indicative of the at least one uncertainty associated with one or more detected objects and the data indicative of the at least one prediction associated with the one or more detected objects.

6. The computer-implemented method of claim 1, further comprising:
    generating data indicative of at least one uncertainty associated with the at least one prediction associated with the one or more detected objects.

7. The computer-implemented method of claim 6, further comprising:
    inputting the data indicative of the at least one prediction associated with the one or more detected objects and the data indicative of the at least one uncertainty associated with the at least one prediction to one or more third machine-learned models that generate motion plans in association with the autonomous vehicle.

8. The computer-implemented method of claim 1, wherein:
    the data indicative of at least one uncertainty associated with the one or more detected objects is generated by the one or more first machine-learned models.

9. The computer-implemented method of claim 1, wherein:
    the data indicative of at least one uncertainty associated with the one or more detected objects is generated externally from the one or more first machine-learned models.

10. The computer-implemented method of claim 1, wherein:
    the data indicative of the at least one uncertainty indicates an uncertainty with respect to detection of the one or more detected objects.

11. The computer-implemented method of claim 1, wherein:
    the data indicative of the at least one uncertainty indicates an uncertainty with respect to a classification of the one or more detected objects.

12. The computer-implemented method of claim 11, wherein:
    the data indicative of one or more detected objects includes data indicative of a first classification of a first object and data indicative of a second classification of the first object; and
    the data indicative of the at least one uncertainty includes a probability distribution associated with the first classification and the second classification.

13. The computer-implemented method of claim 1, wherein:
    the data indicative of the at least one uncertainty indicates an uncertainty with respect to state data indicative of a state of the one or more detected objects.

14. The computer-implemented method of claim 13, wherein the one or more first machine-learned models include:
- at least one detector model that generates object detections; and
- at least one tracking model that generates the state data.

15. The computer-implemented method of claim 1, wherein:
the data indicative of the at least one uncertainty indicates at least one probability distribution with respect to the one or more detected objects.

16. The computer-implemented method of claim 1, wherein:
- the one or more first machine-learned models include a classifier having a calibrated uncertainty value; and
- the one or more first machine-learned models are trained with training data to produce a real probability distribution of a classification based on a distribution of inputs from the training data.

17. The computer-implemented method of claim 1, wherein:
generating data indicative of at least one uncertainty associated with the one or more detected objects includes determining the at least one uncertainty for a current cycle based at least in part on an uncertainty associated with a previous cycle.

18. The computer-implemented method of claim 1, wherein determining data indicative of at least one uncertainty associated with the one or more detected objects comprises:
determining the at least one uncertainty for a first detected object based on a history of detections associated with the first detected object.

19. The computer-implemented method of claim 18, wherein determining the at least one uncertainty for the first detected object comprises:
comparing a current state determined for the first detected object with a previous state determined for the first detected object.

20. The computer-implemented method of claim 1, wherein determining data indicative of at least one uncertainty associated with the one or more detected objects comprises:
- comparing a first output of a first detection system for a first sensor with a second output of a second detection system for a second sensor; and
- determining the at least one uncertainty based at least in part on a comparison of the first output and the second output associated with the one or more detected objects.

21. The computer-implemented method of claim 1, wherein determining data indicative of at least one uncertainty associated with the one or more detected objects comprises:
- determining a distance of a first detected object from the autonomous vehicle;
- determining a number of points in sensor data associated with the first detected object; and
- determining the at least one uncertainty based at least in part on the distance and the number of points.

22. The computer-implemented method of claim 1, wherein determining data indicative of at least one uncertainty associated with the one or more detected objects comprises:
- accessing map data associated with a scene including the one or more detected objects; and
- determining the at least one uncertainty based at least in part on a consistency of the one or more detected objects with the scene.

23. The computer-implemented method of claim 1, wherein the history data comprises information associated with one or more previous object detections that are used to determine uncertainty associated with the one or more detected objects.

24. The computer-implemented method of claim 1, wherein the history data comprises a length of time during which the one or more detected objects have been tracked.

25. The computer-implemented method of claim 1, wherein the history data comprises a number of cycles during which the one or more detected objects have been tracked.

26. The computer-implemented method of claim 1, wherein the history data comprises at least one of a classification or state of the one or more detected objects from a previous cycle.

27. A computing system, comprising:
- one or more first machine-learned models that associated with detect objects external to an autonomous vehicle based at least in part on sensor data;
- one or more second machine-learned models that generate predictions in association with objects external to the autonomous vehicle;
- one or more third machine-learned models that generate motion plans in association with the autonomous vehicle;
- one or more processors; and
- one or more non-transitory computer-readable media that collectively store instructions that, when executed by the one or more processors, cause the computing system to perform operations, the operations comprising:
  - generating, as an output of the one or more first machine-learned models, data indicative of one or more detected objects external to the autonomous vehicle;
  - generating data indicative of at least one uncertainty associated with the one or more detected objects;
  - inputting the data indicative of the one or more detected objects and the data indicative of the at least one uncertainty associated with the one or more detected objects to the one or more second machine-learned models;
  - generating, as an output of the one or more second machine-learned models, data indicative of at least one prediction associated with the one or more detected objects, the at least one prediction based at least in part on the one or more detected objects and the at least one uncertainty;
  - inputting the data indicative of the at least one uncertainty associated with the one or more detected objects and the data indicative of the at least one prediction associated with the one or more detected obj ects to the one or more third machine-learned models; and
  - generating, as an output of the one or more third machine-learned models, data indicative of at least one motion plan based on the one or more detected objects;
  - wherein the data indicative of the at least one motion plan is generated by the one or more third machine-learned models based at least in part on the data indicative of the at least one uncertainty associated with one or more detected objects and the data indicative of the at least one prediction associated with the one or more detected objects.

28. The computing system of claim 27, wherein the operations further comprise:
generating, as an output of the one or more second machine-learned models, data indicative of at least one uncertainty associated with the at least one prediction associated with the one or more detected objects; and
providing the data indicative of the at least one uncertainty associated with the at least one prediction as input to the one or more third machine-learned models.

29. An autonomous vehicle, comprising:
one or more processors; and
one or more non-transitory computer-readable media that collectively store instructions that, when executed by the one or more processors, cause the one or more processors to perform operations, the operations comprising:
inputting sensor data to one or more first machine-learned models that detect objects external to an autonomous vehicle;
obtaining, as an output of the one or more first machine-learned models, data indicative of one or more detected objects external to the autonomous vehicle;
determining data indicative of at least one uncertainty associated with the one or more detected objects at a current cycle, wherein the data indicative of the at least one uncertainty is determined based on the data indicative of the one or more detected objects and history data associated with the one or more detected objects at a previous cycle;
inputting the data indicative of the one or more detected objects and the data indicative of the at least one uncertainty associated with the one or more detected objects to one or more second machine-learned models that generate predictions in association with objects external to the autonomous vehicle; and
obtaining, as an output of the one or more second machine-learned models, data indicative of at least one prediction associated with the one or more detected objects, the at least one prediction based at least in part on the one or more detected objects and the at least one uncertainty.

* * * * *